United States Patent [19]

Brammerlo

[11] 4,205,247
[45] May 27, 1980

[54] PRIME MOVER AND METHODS

[75] Inventor: Allen A. Brammerlo, Sycamore, Ill.

[73] Assignee: General Electric Company, Fort Wayne, Ind.

[21] Appl. No.: 886,874

[22] Filed: Mar. 15, 1978

[51] Int. Cl.² ............................................. H02K 1/12
[52] U.S. Cl. ..................................... 310/256; 310/58; 29/596
[58] Field of Search .................... 310/256, 65, 58, 196, 310/157, 62, 64, 66, 88, 89, 91, 42; 29/596; 336/83 R, 83 M

[56] References Cited

U.S. PATENT DOCUMENTS

| 1,532,351 | 4/1925 | Shea | 310/64 |
|---|---|---|---|
| 2,795,714 | 6/1957 | Baudry | 310/256 |
| 3,114,063 | 12/1963 | Karsten | 310/256 |
| 3,502,916 | 3/1970 | Stavrache | 310/62 |
| 3,714,477 | 1/1973 | Gott | 310/256 |
| 3,714,483 | 1/1973 | Nurnberg et al. | 310/256 |
| 3,886,387 | 5/1975 | Graham | 310/256 |
| 4,031,422 | 6/1977 | Armor | 310/256 |
| 4,033,111 | 7/1977 | Matsuura | 310/256 |

Primary Examiner—R. Skudy
Attorney, Agent, or Firm—Joseph E. Papin

[57] ABSTRACT

A prime mover has a stationary assembly with a pair of opposite pole winding arrangements adapted for energization to establish a magnetic field, a non-ferrous end plate, and a rotatable assembly magnetically associated with the stationary assembly and having a part rotatably supported in the end plate. A shielding device on the end plate for providing a short-circuiting path to conduct a part of the flux of the magnetic field generally across the end plate between the winding arrangement pair upon the energization thereof with the shielding device remaining unsaturated.

A method of operating a prime mover, a method of assembling and operating a prime mover, and a method of making a device and assembling it to a prime mover are also disclosed.

32 Claims, 8 Drawing Figures

PRIME MOVER AND METHODS

FIELD OF THE INVENTION

This invention relates in general to prime movers and in particular to such prime movers adapted to be operated in an environment in which foreign ferrous material objects may be present, a method of operating a prime mover, a method of assembling and operating a prime mover, and a method of making a device and assembling it to a prime mover.

BACKGROUND OF THE INVENTION

Various and sundry types of prime movers, such as dynamoelectric machines or electric movers, have been operated in particular environments in which foreign ferrous material objects or particles were present. For instance, in the environment of an electric dishwasher, the lower one of the end plates of the electric motor utilized to drive such dishwasher may be located closely to the floor on which the dishwasher is supported, and various foreign ferrous material objects, such as thumbtacks, pins, needles or various other ferrous metal objects or particles for instance, may be inadvertantly disposed on the floor in close association with such one or lower end plate of the electric motor. In the event that the aforementioned lower end plate of the electric motor is formed from a non-ferrous material, it is believed that one of the disadvantageous or undesirable features of such past electrical motors was that the leakage flux emanating from the magnetic field generated by such electric motor upon its energization may deleteriously effect the magnetic ingestion of the foreign ferrous material objects into such electric motor through ambient air passages in the non-ferrous end plate. Thus, an analogous disadvantageous or undesirable feature is believed to be that the magnetically ingested foreign ferrous material objects may have effected short circuiting of the winding means of the electric motor or may have interferred between other associated parts of the electric motor so as to cause a malfunction thereof.

In some other larger prime movers, such as generators or altinators for instance, the winding means also establish a magnetic field upon excitation, and means is associated with the winding for, in effect, trapping or obviating the emanation of leakage flux from the magnetic field which would, of course, establish deleterious heating eddy currents in the prime mover.

SUMMARY OF THE INVENTION

Among the several objects of the present invention may be noted the provision of an improved prime mover, an improved method of operating a prime mover, an improved method of assembling and operating a prime mover, and an improved method of making a device and assembling it to a prime mover which overcome the disadvantageous or undesirable features discussed above, as well as others, with respect to the prior art; the provision of such improved prime mover and methods in which the device is utilized to obviate the magnetic ingestion of foreign ferrous material objects into the prime mover but without interferring with the passage of ambient air through an end plate of the prime mover into cooling relation with component parts thereof; the provision of such improved prime mover and methods in which the device transmits leakage flux across a non-ferrous end plate of the prime mover between at least a pair of opposite pole winding means thereof without becoming saturated upon energization of the prime mover; the provision of such improved prime mover and methods in which the device is predeterminately provided with a mass great enough to prevent leakage flux saturation of the device; and the provision of such improved prime mover and methods in which the leakage flux conducted by the device is isolated from ambient air passage means provided through the device so that such passage means define null areas with respect to the conducted leakage flux. These as well as other objects and advantageous features of the present invention will be in part apparent and in part pointed out hereinafter.

In general, a prime mover in one form of the invention has a stationary assembly with a pair of opposite pole winding means adapted for energization to establish a magnetic field therebetween, a non-ferrous end plate, and a rotatable assembly magnetically associated with the stationary assembly and having a part rotatably supported in the end plate. Means is arranged on the end plate for providing a shortcircuiting path to conduct a part of the flux of the magnetic field generally across the end plate between the winding means pair upon the energization thereof with the path providing means remaining unsaturated.

Also in general, a method in one form of the invention is provided for operating a prime mover in an environment in which foreign ferrous material objects may be present with the prime mover having at least one non-ferrous end plate and at least a pair of opposite pole winding means adapted upon energization to create a magnetic field therebetween. In this method, a part of the leakage flux of the magnetic field is conducted from one winding means of the at least winding means pair to the other thereof across the at least one end plate through a shielding device associated with the at least one end plate in flux transfer relation with the at least winding means pair, and ambient air is passed through at least one passage therefor in the shielding device into cooling relation with the at least winding means pair. The shielding device is maintained in an unsaturated condition during the conduction of the part of the leakage flux and the passing of the ambient air thereby to insure that the at least one passage generally defines a null area with respect to the part of the leakage flux conducted by the shielding device in order to obviate the attraction of the foreign ferrous material objects through the at least one passage means into the prime mover.

Further in general and in one form of the invention, a method is provided for assembling and operating the prime mover so as to prevent deleterious magnetic attraction of foreign ferrous material objects into the prime mover in response to the establishment of a magnetic field between at least a pair of opposite pole winding means of the prime mover upon the energization thereof and with the prime mover having at least one non-ferrous end plate. This method comprises the step of associating a device with the at least one end plate for conducting a part of the flux of the magnetic field thereacross between the at least winding means pair upon the establishment of the magnetic field and ensuring that means in the device for the passage of ambient air therethrough past the at least one end plate into the prime mover into cooling relation with the at least winding means pair is unaffected by the conducted flux so as to obviate the attraction through the passage means of the foreign ferrous material objects by providing the device with a preselected mass great enough so that the device remains unsaturated in response to the conducted flux.

Still further in general, a method is provided in one form of the invention for making a device adapted for conducting leakage flux emanating from a magnetic field between at least a pair of winding means of a prime mover upon the energization thereof and assembling the device with respect to at least one means in a non-ferrous end plate of the prime mover for the passage of ambient air into the prime mover into cooling relation with at least the at least winding means pair. In this method, the device is formed so that it has a preselected mass great enough to insure the transmission of the leakage flux therethrough between the at least winding means pair without effecting leakage flux saturation of the device, and another passage means for the ambient air is provided through the device. The device is associated in an assembly position with respect to the end plate, and the at least another passage means is arranged at least in part in aligned relation with respect to the at least one passage means in the end plate. The device is then secured in its assembly position to the prime mover.

BRIEF DESCRIPTION OF THE DRAWINGS

Corresponding reference characters indicate corresponding parts throughout the several views of the drawings.

The exemplifications set out herein illustrate the preferred embodiments of the invention in one form thereof, and such exemplifications are not to be construed as limiting either the scope of the disclosure or the scope of the invention in any manner.

DETAILED DESCRIPTION OF THE PREFERRED EMBODIMENTS

Figure 1:
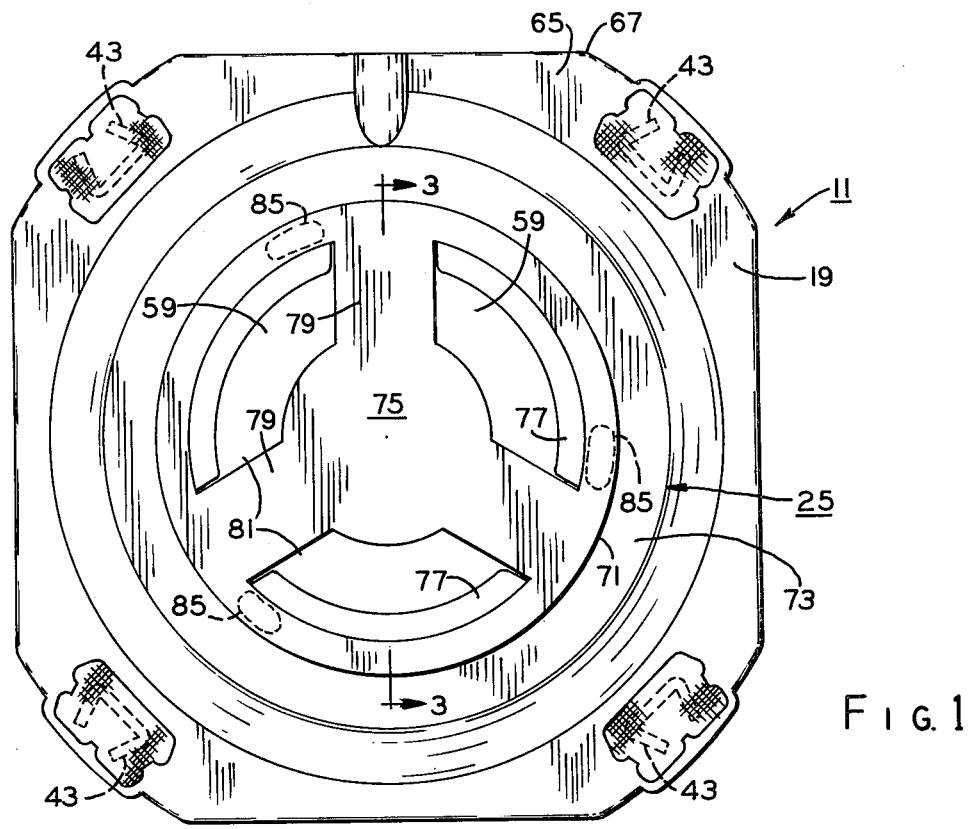
FIG. 1 is an elevational view of a prime mover in one form thereof showing a non-ferrous end plate having disposed thereon in a predetermined assembly position a device for transmitting leakage flux and illustrating principles which may be practiced in a method of operating the prime mover, a method of assembly and operating a prime mover, and a method of making the device and assembling it to a prime mover also in one form of the invention, respectively.
Figure 2:
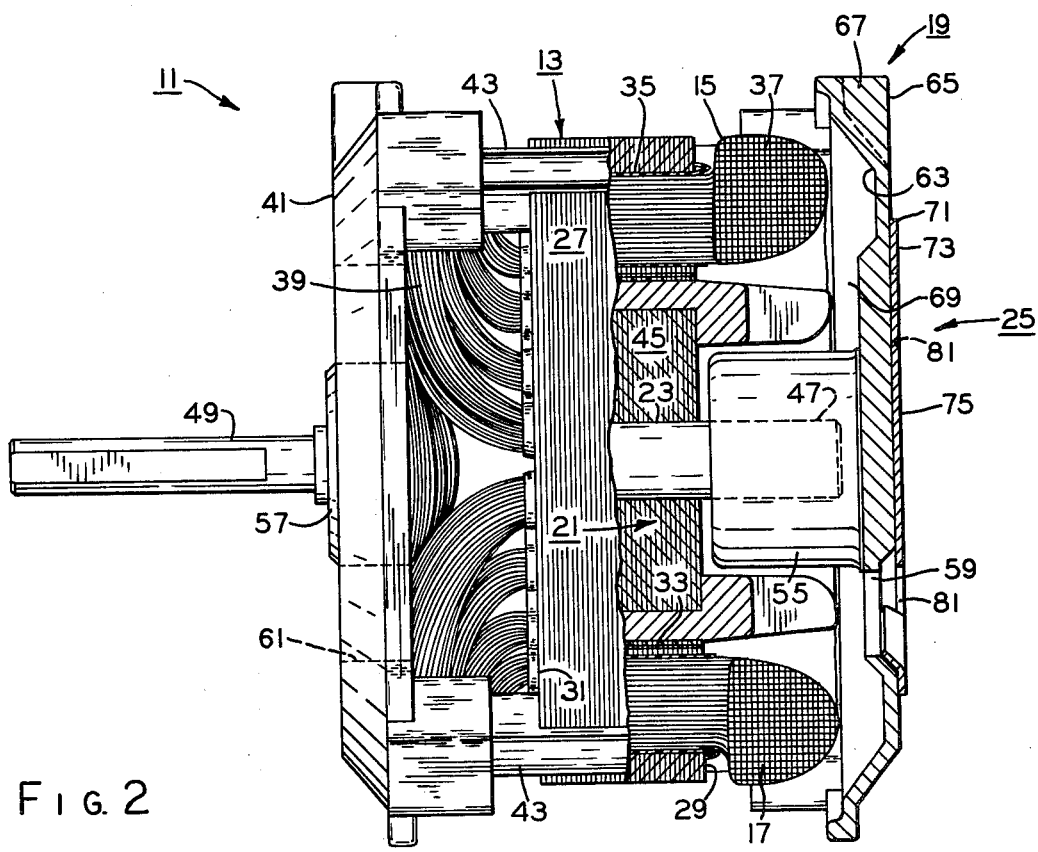
FIG. 2 is a plan view of the prime mover of FIG. 1 partially in section to illustrate components thereof.
Figure 3:
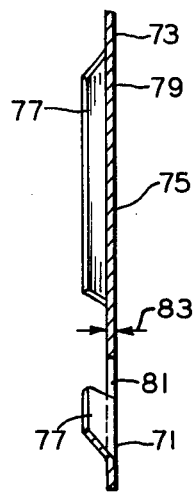
FIG. 3 is a sectional view of the device of FIG. 1 taken along line 3—3 of FIG. 1.

Referring now to the drawings in general, a prime mover 11 in one form of the invention includes a stationary assembly 13 having a pair of opposite pole winding means 15, 17 adapted for energization or excitation to establish a magnetic field therebetween, a non-ferrous end plate 19, and a rotatable assembly 21 magnetically associated with the stationary assembly and having a part, such as a shaft 23, rotatably supported or otherwise suitably journaled in the non-ferrous end plate (FIGS. 1 and 2). A device 25 or means is arranged on end plate 19 for providing a short-circuiting path to conduct or otherwise transmit or transfer a part of the flux, such as for instance leakage flux L, of the magnetic field generally across the end plate between winding means pair 15, 17 upon the energization thereof with the device or path providing means remaining unsaturated by the conducted leakage flux (FIGS. 1–5).

More particularly and with specific reference to FIG. 2, stationary assembly 13 of prime mover 11 comprises a stator 27 which may be formed of a plurality of stacked laminations, as shown for purposes of illustration, or which may be of the powdered iron or cintered metal type, as known in the art. Stator 27 is provided with a pair of end surfaces or faces 29, 31 having a bore 33 interposed therebetween, and the bore is intersected by a plurality of winding slots 35 in which winding means 15, 17 are located with suitable insulation therebetween. Stationary assembly also includes winding means 15, 17, and the winding means may comprise a pair of opposite pole main or run windings and a pair of opposite pole auxiliary or start windings electrically displaced from each other; however, it is contemplated that winding means having various different configurations, interconnections and phase relationships may be utilized within the scope of the invention in one form thereof so as to meet the objects of such invention. Winding means 15, 17 are arranged to form a pair of generally annular groupings of end turns 37, 39 disposed adjacent stator end surfaces 29, 31 and extending generally axially therebeyond, and end plate 19 and an opposite end plate 41 are disposed on prime mover 11 so as to be spaced from the stator end surfaces and spaced adjacent the end turn groupings, respectively. A plurality of structural members or beams 43 are carried by or otherwise fixedly connected to stator 27 adjacent the outer peripheral portion thereof, and the opposite ends of the beams are fixedly connected by suitable means to end plates 19, 41, respectively. If a more detailed discussion of the connection to beam 43 to stator 27 and the connection of beams 43 to end plates 19, 41 is desired, reference may be had to U.S. Pat. No. 3,858,067 issued to Charles W. Otto on Dec. 31, 1974 and to U.S. Pat. No. 3,867,654 issued to Charles W. Otto on Feb. 18, 1974, and each of these patents is specifically incorporated herein by reference. Although the particular constructions of stationary assembly 13 and end plates 19, 41 are disclosed herein for purposes of illustration, it is contemplated that other prime mover constructions may be utilized within the scope of the invention so as to meet the objects thereof. For instance, in one such other contemplated construction, a stator may be enclosed within a housing therefor with opposite end plates secured to the housing by suitable means.

Rotatable assembly 21 includes a rotor 45 rotatably disposed within bore 33 of stator 27 so as to be magnetically coupled therewith, and the rotor is mounted to shaft 23 for conjoint rotation therewith. Shaft 23 is provided with opposite ends or sections 47, 49 which are rotatably received or otherwise suitably journaled in a pair of bearings or bearing means, (not shown) within a pair of hubs or the like 55, 57 on end plates 19, 41.

A plurality of means, such as passages 59, 61, are respectively provided in end plates 19, 44 for the passage of ambient air therethrough into prime mover 11 into cooling relation with stationary assembly 13 and rotatable assembly 21 therefor. As previously mentioned and referring also to FIGS. 1 and 4, end plate 19 is formed of non-ferrous material, such as aluminum or an alloy thereof for instance; however, it is contemplated that other end plates having other shapes or configurations and formed of other non-ferrous metals or a resin material for instance may be utilized with prime mover 11 within the scope of the invention in one form thereof so as to meet the objects and advantageous features of such invention. End plate 19 is provided with a pair of opposite interior and exterior faces 63, 65 with interior face 63 being disposed adjacent end turn 37, and a generally outer or peripheral marginal section 67 to which beams 43 are attached, as previously mentioned, is interposed between the opposite faces of the end plate. A plurality of generally radially extending supports or extensions 69 are integrally formed between outer marginal section 67 and a generally centrally located means, such as hub 55, for rotatably journaling or supporting end section 47 of rotor shaft 45.

As employed with prime mover 11, device 25 is adapted for obviating the magnetic attraction ingress or ingestion of foreign ferrous material objects, such as for instance thumbtacks, pins, needles, nails, screws or other such ferrous material objects or particles or the like (not shown) into the prime mover through passages 59 in end plate 19 into deleterious magnetic engagement with prime mover components or into deleterious mechanical interference engagement therebetween upon the energization of the prime mover to create the magnetic field thereof, as discussed hereinafter. For purposes of illustration, device 25, as shown in FIGS. 1-4, is disclosed as being punched or lanced from a ferrous material, such as sheet steel for instance, and various types of well known tooling and equipment, such as for instance die sets or progressive dies for instance, may be utilized to this end; however, for the sake of brevity, a description of such tooling and equipment is omitted. Device 25 comprises a ferrous material member or body, such as a shield or shielding means 71, and shield 71 is provided with an outer peripheral portion, such as a generally annular rim or section 73 or the like for instance, and an inner peripheral portion, such as a generally circular disc, hub or section 75 or the like for instance, spaced generally radially inwardly of the rim. A plurality of integral flanges 77 or the like may be bent generally away from rim 73 is desired. A plurality of arms or arm means, such as generally radially extending spokes 79 or the like, are integrally formed or otherwise connected between rim 73 and disc 75, and a plurality of means, such as passages 81, for the passage therethrough of ambient air are respectively defined between the rim, hub and arms so as to extend generally axially through shield 25. Although this particular shape or configuration of shield 25 is disclosed for purposes of illustration, it is contemplated that shields having various shapes or configurations different than shield 71 may be utilized within the scope of the invention so as to meet the objects and advantageous features thereof. For instance, it is contemplated that at least one ambient air passage may be provided through the shield having a shape distinctly different than that of passages 59 in end plate 19 in one form of the invention so as to meet the objects thereof. However, irrespective of the particular shape of passages 81, such passages must be sized and disposed so as not to impare or impede the desirable flow rate of ambient air for cooling prime mover 11. As previously mentioned, shield 71 is utilized to conduct leakage flux L upon energization of prime mover 11, and to this end, the shield is provided with a preselected mass great enough so that the shield remains unsaturated or in an unsaturated condition with respect to the leakage flux conducted thereby; thus, it may be noted that shield 71 is provided with a preselected cross-section or thickness 83 in the direction of the path of leakage flux L therethrough. Since shield 71 remains unsaturated with respect to leakage flux L carried thereby, it may also be noted that the leakage flux will not carry into or carry across passages 81 in the shield; therefore, such passages define null areas with respect to the leakage flux, i.e., such areas are devoid of leakage flux upon the energization of prime mover 11, as discussed hereinafter.

Figure 4:
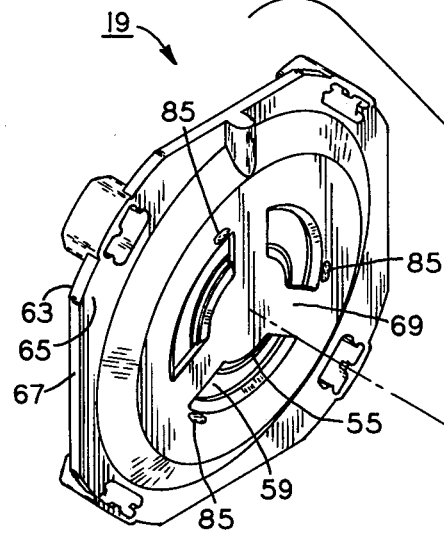
FIG. 4 is an isometric view showing the device for transmitting leakage flux in exploded relation with respect to the non-ferrous end plate of the prime mover.
Figure 5:
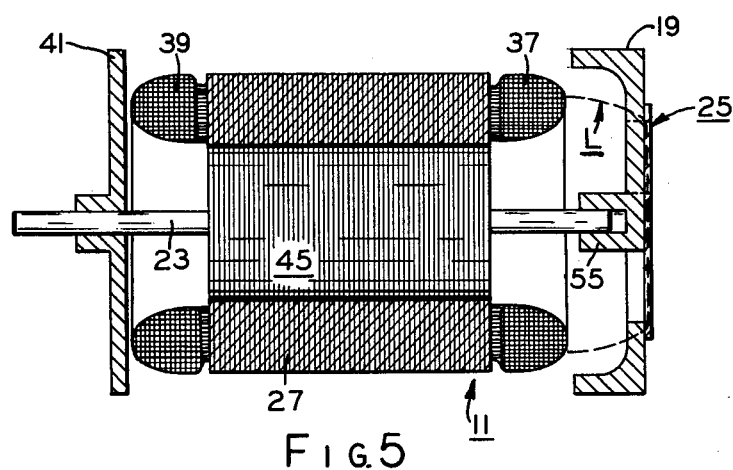
FIG. 5 is a schematic view of the prime mover of FIG. 1 illustrating the transmission of leakage flux emanating from the magnetic field between a pair of opposite pole winding means of the prime mover.

Referring again in general to the drawings and recapitulating at least in part with respect to the foregoing, a method in one form of the invention is illustrated for making device 25 which is adapted for conducting leakage flux L emanating from a magnetic field between at least winding means pair 15, 17 of prime mover 11 upon energization thereof and for assembling the device with respect to passages 59 in non-ferrous end plate 19 for the passage of ambient air into the prime mover into cooling relation with at least the winding means pair (FIGS. 1-5). In this method, device 25 is formed so that it has a preselected mass great enough to insure the transmission of leakage flux L therethrough between winding means pair 15, 17 without effecting leakage flux saturation of the device, and passages 81 are provided through the device for the ambient air (FIGS. 2 and 5). Device 25 is moved or otherwise disposed into its assembly position with respect to end plate 19 so that passages 81 in the device are arranged at least in part in aligned relation with respect to the passages 59 in the end plate (FIGS. 1 and 4). Thereafter, device 25 may be secured in its assembly position to end plates 19 (FIGS. 1 and 4).

More particularly and with specific reference to FIGS. 1 and 4, means, such as an epoxy, glue or other adhesive 85, for adhering or for otherwise fixedly mounting device 25 in its assembly position to end plate 19 may be applied to either or both the device and the end plate at selected locations thereon, and of course, upon drying or setting, the adhering or mounting means, such as adhesive 85, fixedly associates the device in its assembly position on an exterior face or surface of the end plate. While adhesive 85 is disclosed for mounting or securing device 61 to the exterior face of end plate 19, it is contemplated that the device may be mounted to the interior face of the end plate, as discussed hereinafter, and that alternative mounting means or constructions may be utilized in conjunction with device 25 to effect the mounting thereof to end plate 19 within the scope of the invention so as to meet the objects and advantageous features thereof. At least one such alternative construction is disclosed in the Michael R. Barone copending application Ser. No. 886,672 filed Mar. 15, 1978 which is incorporated herein for reference.

It is contemplated that device 25 may be located or placed in its preselected assembly position on end plate 19 either manually or by automatic assembly equipment (not shown) within the scope of the invention in one form thereof so as to meet the objects and advantageous features of such invention. When device 25 is so arranged or located in its preselected assembly position on exterior face 65 of end plate 19, passages 81 of the device are preferably arranged so as to generally coincide, align or at least communicate with passages 59 in end plate 19 in order to provide adequate or desired flow of ambient air therethrough to effect the proper or desired cooling of prime mover 11, as previously mentioned, and arm means 79 of the device are disposed generally in overlaying relation with supports 69 of the end plate. Further, disc 75 of device 25 is disposed or arranged generally adjacent end section 47 of rotor shaft 23 so as to be in flux transfer relation therewith, and rim 73 of device 25 is disposed or arranged adjacent end turns 37 of winding means 15, 17 so as to be in flux transfer relation therewith.

Figure 6:
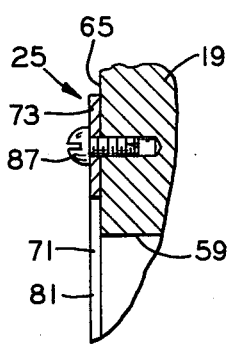
FIG. 6 is a partial sectional view showing an alternative means for securing the device in its assembly position on the end plate of the prime mover of FIG. 1 also in one form of the invention.

In one modification shown in FIG. 6 in one form of the invention, device 25 is attached to end plate 19 by a plurality of screws 87 instead of the above discussed adhesive 85.

In the operation of prime mover 11, assume it is located in a particular environment, such as may be associated with an electric dishwasher for instance, so that upper end plate 41 of the prime mover may be mounted to the dishwasher housing (not shown) while lower end plate 19 may be spaced in at least rather close relation with the floor or other support upon which the dishwasher housing may rest. In such environment, the possibility may always exist that the aforementioned foreign ferrous material objects (not shown) may be present or inadvertently disposed beneath the dishwasher housing on the floor so as to be disposed in closed space relation with lower end plate 19 of prime mover 11. It is, of course, contemplated that prime mover 11 may be utilized with apparatus other than an electric dishwasher as well as in other environments in which foreign ferrous material objects or particles may be present within the scope of the invention so as to meet the objects thereof.

Upon the selective energization of prime mover 11, winding means 15, 17 are excited so as to establish or create the aforementioned magnetic field therebetween, and current is thus induced into rotor 45 to effect its energization and rotation conjointly with shaft 23 in end plates 19, 41, respectively, as is well known in the art and as best seen in FIG. 2. As shown schematically in FIG. 5, leakage flux L emanating from the magnetic field upon the establishment thereof flows or is transmitted from one of winding means 15, 17 to shield 71 on end plate 19, and rim 73, disc 77 and arms 79 of the shield conducts the leakage flux or provides a short circuiting path for the leakage flux therethrough to the other of winding means 15, 17. Some of the leakage flux L may be transferred from disc 77 of shield 71 to end section 47 of rotor shaft 23 supported in hub 55 of end plate 19. Since shield 71 is provided with a preselected mass great enough so that the shield remains unsaturated with respect to the amount of leakage flux L it conducts, ambient air passages 81 in the shield are, in effect, null areas with respect to the conducted leakage flux in the shield. In other words, due to the unsaturated condition of shield 71, leakage flux L conducted by the shield does not carry into or across passages 81 thereby to obviate magnetic attraction therethrough of the foreign ferrous material objects, as previously mentioned. Thus, when conducting leakage flux L, shield 71 is effective to provide the ingestion of foreign ferrous material objects through its ambient air passages 81 and the ambient air passages 59 in lower end plate 19 into deleterious magnetic engagement with the various flux carrying components of prime mover 11, i.e., in particular winding means 15, 17 since any attraction of the foreign ferrous material objects into engagement therewith may cause damage thereto so as to effect a short circuit in the winding means. Further, it may be noted that ambient air passages 81 in shield 71 is preferably predeterminately sized and assembled in position with respect to passage 59 in end plate 19 so as to effect an adequate or desirable rate of flow of ambient air therethrough in order to meet the desired criteria for proper cooling of prime mover 11.

In view of the foregoing and with reference again in general to the drawings, a method in one form of the invention is provided for assembling and operating prime mover 11 so as to prevent deleterious attraction of any foreign ferrous material objects thereinto in response to the establishment of a magnetic field between winding means pair 15, 17 of the prime mover upon the energization thereof with the prime mover having at least one non-ferrous end plate 19 (FIGS. 1 and 2). In this method, device 25 is associated with end plate 19 for conducting a part of the flux, such as leakage flux L, of the magnetic field across end plate 19 between winding means pair 15, 17 upon the establishment of the magnetic field, and it is ensured that passages 81 in the device for the passage of ambient air therethrough past the end plate into the prime mover into cooling relation with at least the winding means pair is unaffected or unsaturated by the conducted flux so as to obviate the attraction through the passages of the foreign ferrous material objects by providing the device with a preselected mass great enough so that the device remains unsaturated in response to the conducted flux (FIGS. 1, 4 and 5).

Figure 7:
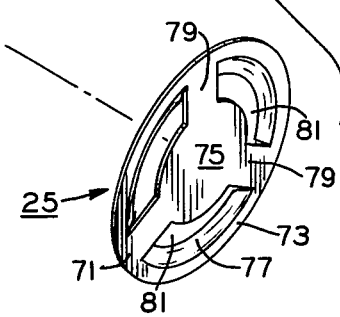
FIG. 7 is a partial sectional view showing an alternative device for transmitting leakage flux associated with the interior face of the non-ferrous end plate of the prime mover of FIG. 1 also in one form of the invention.
Figure 8:
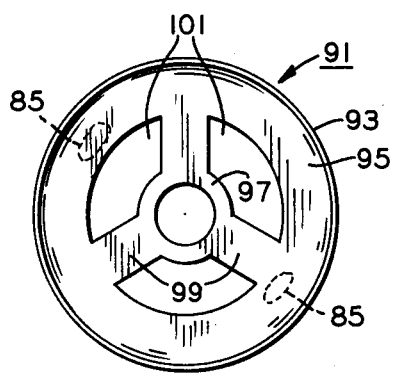
FIG. 8 is a plan view of the alternative device of FIG. 7.

Referring now to FIGS. 7 and 8, there is shown in association with prime mover 11 another device 91 having generally the same component parts and functioning generally in the same manner as the previously described device 25 with the exceptions discussed hereinafter, and while device 91 meets at least some of the objects set forth above, it is believed that device 91 may have objects and advantageous features of its own as will be in part apparent and in part pointed out hereinafter.

Device 91 is also adapted for obviating the ingress or ingestion of the foreign ferrous material objects into prime mover 11 into deleterious magnetic attraction engagement with stationary assembly 13 and rotatable assembly 21 or so as to be lodged in mechanical interferring engagement therebetween. Device 91 comprises a ferrous material member or body, such as shielding means or shield 93 for instance, which may be punched and/or otherwise formed in the manner previously discussed with respect to device 25 from ferrous metal, such as for instance sheet steel or the like, and the shield is mounted or otherwise secured to the inner face or surface 63 of end plate 19 with the shield having a configuration or being contoured to generally fit that of the inner face. Shield 93 is provided with a pair of generally radially spaced peripheral portions, such as outer and inner generally annular rims, margins or sections 95, 97, and a plurality of arms or arm means, such as generally radially extending spokes 99 or the like, are integrally formed or otherwise connected between rims 95, 97. A plurality of means, such as passages 101 are respectively defined between the rim, hub and arms. Even though inner rim 97 overlays a part of passages 51 in end plate 19, it may be noted that the particular shape or configuration of passages 101 is generally the same as that of passages 59 in end plate 19 so as not to appreciably diminish ambient air flow therethrough upon energization of prime mover 11. Shield 93 is utilized to conduct leakage flux L upon energization of prime mover 11, and to this end, the shield is provided with a mass predeterminately great enough so that the shield remains unsaturated or in an unsaturated condition with respect to the leakage flux conducted thereby; thus, shield 93 is provided with a preselected cross-sectional area 103 in the direction of the path of leakage flux L therethrough. Since shield 93 remains unsaturated with respect to leakage flux L carried thereby, the leakage flux will not carry into or carry across passages 101 in the shield; therefore, such passages define null areas with respect to the leakage flux, i.e., such areas are devoid of leakage flux upon the energization of prime mover 11.

Adhesive 85 may be applied to either or both of device 91 and end plate 19 so as to adhere or otherwise fixedly mount the device in its assembly position to the end plate, in the same manner as previously discussed, and it is also contemplated that other mounting means may be utilized so as to mount or fixedly associate the device in its assembly position on the interior face or surface of the end plate.

In view of the foregoing, it is now apparent that a novel prime mover, a novel method of operating a prime mover, a novel method of assembling and operating a prime mover, and a novel method of making a device and assembling it to a prime mover as provided meeting the objects and advantageous features therefor set forth hereinabove, as well as others, and that modification as to the precise configurations, shapes, details, and connections of the components of the prime mover as well as to the precise order of the steps of the methods, may be made by those having ordinary skill in the art without departing from the spirit of the invention or the scope thereof as set out by the claims which follow.

What I claim as new and desire to secure by Letters Patent of the United States is:

1. In a prime mover adapted to be operated in an environment in which foreign ferrous material objects may be present, the prime mover having a stator, a pair of opposite end faces on the stator, a bore in the stator and intersecting with the opposite end faces, at least one pair of opposite pole winding means associated with the stator for creating a magnetic field upon the excitation of the at least one winding means pair, the at least one winding means pair having at least one grouping of end turns with the at least one grouping of end turns being disposed adjacent one of the opposite end faces so as to extend therebeyond, at least one non-ferrous material end plate disposed on the prime mover and spaced from the one opposite end face so as to be adjacent the at least one grouping of end turns, a rotatable shaft having a section rotatably received in the at least one end plate, a rotor mounted to the shaft so as to be conjointly rotatable therewith and disposed at least in part within the bore in magnetic coupling relation with the at least one winding means pair upon the excitation thereof, at least one means in the at least one end plate for the passage therethrough of ambient air into cooling relation with the at least one grouping of end turns and at least a part of the rotor; the improvement comprising a device adapted for obviating the ingress of the foreign ferrous material objects into the prime mover into deleterious magnetic attraction engagement with the at least one grouping of end turns or the rotor upon the excitation of the at least one winding means pair to create the magnetic field, said device including a shield 25, 71 of ferrous material mounted to the at least one end plate so as to provide generally thereacross a path for leakage flux of the magnetic field created between the at least one winding means pair upon the excitation thereof, an outer peripheral portion on said shield, another portion on said shield spaced from said outer peripheral portion so as to be disposed generally adjacent the shaft section in flux transfer relation therewith, at least another means between said outer peripheral portion and said another portion of said shield and arranged at least in part with the at least one passage means for the passage of the ambient air through the at least one passage means and said at least another passage means into the cooling relation with the at least one grouping of end turns and the at least part of the rotor, and said shield having a preselected cross-sectional area generally in the direction of said path for the leakage flux so that said shield remains unsaturated in response to the leakage flux in said path and said at least another passage means defines a null area with respect to the leakage flux in said path thereby to obviate magnetic attraction in response to the excitation of the least one winding means pair of the foreign ferrous material objects through the at least one passage means said at least another passage means into the prime mover.

2. In a prime mover adapted to be subjected to an environment in which foreign ferrous material objects may be present, the prime mover including a stationary assembly having at least a pair of opposite pole winding means adapted for energization to create a magnetic field therebetween, at least one non-ferrous end plate, and a rotatable assembly associated in magnetic coupling relation with the stationary assembly and having a part in journaled relation with the at least one end plate; the improvement comprising a device for obviating the magnetic attraction of the foreign ferrous material objects through the at least one end plate into the prime mover in response to the magnetic field created upon the energization of the at least winding means pair, said device including shielding means at least associated with the at least one end plate for establishing a path generally across the at least one end plate between the at least winding means pair to accomodate leakage flux emanating from the magnetic field, and said shielding means having a preselected mass great enough so that said shielding means remains in an unsaturated condition in response to the leakage flux in said path.

3. The prime mover as set forth in claim 2 wherein said device further includes at least one means in said shielding means for the passage therethrough and past the at least one end plate of ambient air into cooling relation with the stationary assembly and the cooling assembly, and the unsaturated condition of said shielding means ensuring that the leakage flux does not enter into said at least one passage means so that it defines a null area thereby to obviate magnetic attraction therethrough of the foreign ferrous material objects.

4. The prime mover as set forth in claim 2 wherein said device further includes a portion on said shielding means disposed generally adjacent the rotatable assembly part in leakage flux transfer relation therewith, and said path including said shielding means portion.

5. The prime mover as set forth in claim 2 further comprising means for mounting said shielding means to the at least one end plate generally exteriorly of the prime mover.

6. The prime mover as set forth in claim 2 further comprising means for mounting said shielding means to the at least one end plate generally between it and the stationary assembly.

7. In a prime mover having a stationary assembly with a pair of opposite pole winding means adapted for energization to establish a magnetic field therebetween, a non-ferrous end plate, and a rotatable assembly magnetically associated with the stationary assembly and having a part rotatably supported in the end plate; the improvement comprising means arranged on the end plate for providing a short-circuiting path to conduct a part of the flux of the magnetic field generally across the end plate between the winding means pair upon the energization thereof with the path providing means remaining unsaturated.

8. The primer mover as set forth in claim 7 wherein said path providing means comprises a ferrous material member having a preselected mass great enough so that said path providing means remains in an unsaturated condition with respect to the flux part conducted thereby.

9. The prime mover as set forth in claim 7 further comprising at least one means in said path providing means for the passage therethrough of ambient air past the end plate into cooling relation with the stationary assembly and the rotatably assembly.

10. The prime mover as set forth in claim 7 further comprising means extending through said path providing means for the passage of ambient air into the prime mover, and said path providing means having a mass great enough to insure that said passage means comprises a null area with respect to the flux part conducted by said path providing means.

11. The prime mover as set forth in claim 7 wherein said path providing means includes a portion arranged in flux transfer relation with rotatable member part rotatably supported in the end plate.

12. A method of operating a prime mover in an environment in which foreign ferrous material objects may be present with the prime mover having at least one non-ferrous end plate and at least a pair of opposite pole winding means adapted upon energization to create a magnetic field therebetween, the method comprising the steps of:
(a) conducting a part of the leakage flux of the magnetic field from one winding means of the at least winding means pair to the other thereof across the at least one end plate through a shielding device arranged on the at least one end plate in leakage flux transfer relation with the at least winding means pair and passing ambient air through at least one passage therefor in the shielding device past the at least one end plate into cooling relation with the at least winding means pair; and
(b) maintaining the shielding device in an unsaturated condition during the conducting and passing step and insuring thereby that the at least one passage generally defines a null area with respect to the part of the leakage flux conducted by the shielding device in order to obviate the magnetic attraction of the foreign ferrous material objects through the at least one passage means into the prime mover.

13. A method of assembling a prime mover and operating it so as to prevent deleterious magnetic attraction of foreign ferrous material objects thereinto in response to the establishment of a magnetic field between at least a pair of opposite pole winding means of the prime mover upon the energization thereof and with the prime mover having at least one non-ferrous end plate, the method comprising: associating a device with the at least one end plate for conducting thereacross leakage flux of the magnetic field thereacross between the at least winding means pair upon the creation of the magnetic field and insuring that means in the device for the passage of ambient air therethrough past the at least one end plate into the prime mover into cooling relation with the at least winding means pair is unaffected by the conducted leakage flux so as to obviate the attraction through the passage means of the foreign ferrous material objects by providing the device with a preselected mass great enough so that the device remains unsaturated in response to the conducted leakage flux.

14. The method as set forth in claim 13 wherein the associating and insuring step comprises securing the device to the at least one end plate.

15. The method as set forth in claim 13 wherein the associating and insuring step comprises mounting the device directly onto the at least one end plate in one of a pair of assembly positions respectively internally and externally of the prime mover.

16. The method as set forth in claim 13 wherein the associating and insuring step comprises arranging the passage means of the device so as to be disposed at least in part in ambient air passage communication with other means in the at least one end plate for the passage of the ambient air.

17. The method as set forth in claim 13 wherein the device has a cross-sectional area in the direction of the leakage flux conduction therethrough which is great enough so that the device remains unsaturated in response to the conducted leakage flux, the cross-sectional area defining in part the mass of the device.

18. The method as set forth in claim 13 wherein the associating and insuring step comprises attaching the device with a plurality of screws to the at least one end plate.

19. A method for making a device adapted for conducting leakage flux emanating from a magnetic field between at least one pair of opposite pole winding means of a prime mover upon the energization thereof and assembling the device with respect to at least one means in a non-ferrous end plate of the prime mover for the passage of ambient air into the prime mover into cooling relation with at least the at least winding means pair, the method comprising the steps of:
(a) forming the device so that it has a preselected mass great enough to insure the transmission of the leakage flux therethrough between the at least winding means pair without effecting leakage flux saturation of the device and providing through the device at least another passage means for the ambient air;
(b) associating the device in an assembly position with respect to the end plate and arranging the at least another passage means at least in part in aligned relation with respect to the at least one passage means in the end plate; and (c) securing the device in its assembly position to the end plate.

20. The method as set forth in claim 19 wherein the device has a cross-sectional area great enough in the direction of the leakage flux conduction therethrough so that the device is unsaturated upon the leakage flux conduction thereby, the cross-sectional area defining in part the mass of the device.

21. The method as set forth in claim 19 wherein the forming and providing step comprises defining a peripheral portion on the device so that the peripheral portion is disposed generally adjacent the at least winding means pair during the associating and arranging step.

22. The method as set forth in claim 19 wherein the prime mover has a rotatable assembly adapted to be magnetically coupled with the at least winding means pair and with a part of the rotatable assembly journaled in the end plate, and wherein the forming and providing step comprises defining a portion on the device so that the portion is disposed generally adjacent the rotatable assembly part during the associating and arranging step.

23. The method as set forth in claim 19 wherein the associating and arranging step comprises positioning the device in the assembly position thereof on the end plate exteriorly of the prime mover.

24. The method as set forth in claim 19 wherein the associating and arranging step comprises positioning the device in the assembly position thereof on the end plate interiorly of the prime mover.

25. The method as set forth in claim 19 wherein the securing step comprises deforming at least a portion of the device into displacement preventing engagement with the end plate so as to dispose thereon the device in its assembly positon.

26. The method as set forth in claim 19 wherein the securing step comprises attaching the device in the assembly position thereof to the end plate with a plurality of screws.

27. A method of operating a prime mover in an environment in which foreign ferrous material objects may be present, the prime mover having at least a pair of opposite pole winding means adapted upon energization for establishing a magnetic field therebetween and the prime mover also having at least one generally non-ferrous end plate with at least one means therein for the passage of ambient air through the at least one end plate into cooling relation with at least the at least winding means pair, the method comprising: carrying at least a part of the leakage flux from the magnetic field between the at least winding means pair through a ferrous material shielding device arranged on the at least one non-ferrous material end plate and passing the ambient air into the cooling relation with at least the at least winding means pair through at least one passage in the shielding device arranged at least in part in ambient air passage communication with the at least one passage means in the at least one non-ferrous material end plate, the shielding device having a mass great enough to remain generally unsaturated in response to the leakage flux carried thereby so that the at least one passage in the shielding device defines a null area obviating magnetic attraction therethrough of the foreign ferrous material object into the prime mover.

28. The method as set forth in claim 27 wherein the shielding device includes a peripheral portion disposed generally adjacent the at least winding means pair in leakage flux transfer relation therewith.

29. The method as set forth in claim 27 wherein the shielding device is secured to the at least one non-ferrous material end plate.

30. The method as set forth in claim 27 wherein the prime mover has a rotatable assembly adapted to be magnetically coupled with the at least winding means pair and with a part of the rotatable assembly journaled in the at least one non-ferrous material end plate, the shielding device also having a portion thereof arranged generally adjacent the rotatable assembly part in leakage flux transfer relation therewith.

31. The method as set forth in claim 27 wherein the shielding device is provided with a cross-sectional area great enough in the direction of the leakage flux carried therethrough so that the shielding device remains unsaturated in response to the leakage flux, the cross-sectional area of the shielding device defining in part the mass thereof.

32. In a prime mover having a stationary assembly with at least a pair of opposite pole winding means adapted for energization to establish a magnetic field therebetween, a non-ferrous material end plate, and a rotatable assembly magnetically associated with the stationary assembly and having a part rotatably supported in the end plate; the improvement comprising a ferrous metal member arranged on the end plate and including a peripheral section disposed generally in flux transfer relation with the at least winding means pair, a generally central portion on said ferrous metal member disposed generally in flux transfer relation with the rotatable assembly part, a plurality of arms extending between said peripheral section and said central portion and integrally formed therewith, a plurality of passages respectively defined between said arms and extending through said ferrous metal member, said peripheral section, said central portion and said arm plurality providing a short circuiting path the conduct at least a part of the leakage flux of the magnetic field generally across the end plate between the at least winding means pair upon the energization thereof, and said ferrous metal member having a mass great enough to remain generally unsaturated with respect to the conducted at least part of the leakage flux and to insure that said passage plurality are null with respect to the conducted at least part of the leakage flux.

* * * * *